(12) United States Patent
Okai et al.

(10) Patent No.: US 8,064,681 B2
(45) Date of Patent: Nov. 22, 2011

(54) METHOD AND APPARATUS FOR INSPECTING RETICLE

(75) Inventors: Nobuhiro Okai, Kokubunji (JP); Shinji Okazaki, Saitama (JP); Yasunari Sohda, Kawasaki (JP); Yoshinori Nakayama, Sayama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 541 days.

(21) Appl. No.: 12/292,660

(22) Filed: Nov. 24, 2008

(65) Prior Publication Data
US 2009/0136116 A1 May 28, 2009

(30) Foreign Application Priority Data

Nov. 28, 2007 (JP) .................................. 2007-307313

(51) Int. Cl.
*G06K 9/00* (2006.01)
(52) U.S. Cl. ........................................................ 382/141
(58) Field of Classification Search .................... 382/141
See application file for complete search history.

(56) References Cited

U.S. PATENT DOCUMENTS

| 5,586,058 | A | * | 12/1996 | Aloni et al. | 702/35 |
| 5,619,429 | A | * | 4/1997 | Aloni et al. | 700/279 |
| 5,717,781 | A | * | 2/1998 | Ebel et al. | 382/141 |
| 6,047,082 | A | * | 4/2000 | Rhody et al. | 382/141 |
| 2003/0179919 | A1 | * | 9/2003 | Goldberg et al. | 382/141 |
| 2004/0037457 | A1 | * | 2/2004 | Wengender et al. | 382/141 |
| 2005/0086618 | A1 | * | 4/2005 | Ito et al. | 716/4 |
| 2007/0260419 | A1 | * | 11/2007 | Hagiwara | 702/150 |

FOREIGN PATENT DOCUMENTS

| JP | 11-44664 | 7/1997 |
| JP | 2005-98885 | 9/2003 |
| JP | 2007-121607 | 10/2005 |

\* cited by examiner

*Primary Examiner* — Patrick J Connolly
(74) *Attorney, Agent, or Firm* — Stites & Harbison PLLC; Juan Carlos A. Marquez, Esq.

(57) ABSTRACT

The present invention provides a reticle inspection technology that enables a relative position between patterns to be evaluated for a pattern that may become a defect at the time of exposure to a sample, such as a wafer, in the double patterning technology on the same layer. An apparatus for inspecting a reticle for inspecting two reticles that are used in order to form patterns in the same layer on a substrate using the double patterning technology has: a coordinate information input unit for inputting coordinate information of a pattern of a measuring object; an image input unit for acquiring images of patterns of the two reticles based on the obtained coordinate information; an image overlay unit for overlaying the images of the two reticles at the same coordinates; a relative position calculation unit for finding the relative position between the patterns on the two reticles; an evaluation unit for assigning an index of the overlaying accuracy based on the relative position and evaluates whether the two reticles need repair; and an evaluation result output unit for outputting an evaluation result.

16 Claims, 10 Drawing Sheets

REJECT | SUSPENSION | PASS | SUSPENSION | REJECT → EVALUATION VALUE

DEFINED VALUE 1 | DEFINED VALUE 2 | DESIGN VALUE | DEFINED VALUE 3 | DEFINED VALUE 4

503, 501, 502

504

505

METHOD AND APPARATUS FOR INSPECTING RETICLE

CLAIM OF PRIORITY

The present application claims priority from Japanese patent application JP 2007-307313, filed on Nov. 28, 2007, the content of which is hereby incorporated by reference into this application.

BACKGROUND OF THE INVENTION

The present invention relates to a scanning electron microscope apparatus and an evaluation system technology of a pattern, and more specifically, to a reticle inspection technology suited to perform relative position evaluation of patterns on two reticles that are used in order to form patterns on the same layer using the double patterning technology.

For critical dimension evaluation of a reticle pattern, the transmission-type optical microscopes have been used, partly because the reticle is used in a usage of transferring a light transmittance pattern. However, it has become difficult to measure the pattern optically as the pattern becomes finer, and it becomes indispensable to use a scanning electron microscope (SEM) having a higher resolution for patterns (pattern elements) of smaller than 90 nm.

In recent years, in order to attain more minute patterns further, super micro-machining technologies called RET (Resolution Enhancement Techniques), for example, OPC (optical proximity correction) and DPT (double-exposure, double-patterning), are used, and consequently it has become necessary to evaluate accuracy of a pattern using the electron microscope. It is known that a pattern manufactured using these technologies easily becomes a resolving difficult spot (hot spot) that produces a cause of defective transfer, such as a short (a short circuit) and a disconnection. Especially, in the double-patterning, since the patterning is conducted on the same layer by two times of processing in contrast to the conventional pattering, the relative position between the two reticles has become important. However, a current situation is that CD measurement of the reticle pattern using the electron microscope is mainly performed on critical dimensions (CD's) of a single pattern and between plural patterns, and it cannot be said that a technique of evaluating the relative position between the two reticle patterns has been established.

As a method for measuring the relative position between the patterns existing on plural layers, a method for evaluating overlaying accuracy using reticle pattern images acquired by the electron microscope (for example, see JP-A-2007-121607) and a method for measuring patterns on a wafer by irradiation of a high-voltage electron beam (for example, see JP-A-11-44664) have been developed.

JP-A-2007-121607 describes a technique whereby an image is acquired for a reticle having a defective inclusion pattern by the electron microscope, an image of a substrate is obtained by performing a lithography simulation on this, an inclusion distance is calculated by overlaying the two pattern images at the same coordinates, and it is judged whether it satisfies the defined value. The use of this technology makes it possible to estimate, at the time of reticle formation, the relative position between the patterns existing on plural layers that cannot be inspected with a low-voltage electron microscope after pattern completion.

JP-A-11-44664 describes a technology of directly measuring the relative position between the patterns existing on plural layers using an electron microscope with an acceleration voltage of 100 to 500 kV.

SUMMARY OF THE INVENTION

Digressing to a relative position between patterns, since a method for evaluating the relative position between the patterns developed by JP-A-2007-121607 performs electron microscope photography after formation of the pattern and does not evaluate the relative position, it is necessary to strictly check whether the relative position between the patterns satisfies a defined value at the time of reticle formation. Although the relative position may be directly evaluated after pattern formation using the method developed by JP-A-11-44664, since it uses a high-voltage electron beam, it brings about a problem of pattern damage, which makes it difficult to apply it for measurement of an actual pattern. Moreover, since an underlayer is already processed, re-production becomes difficult.

Furthermore, the technique of JP-A-2007-121607 performs inspection only on a pattern that was judged as a defect by other inspection apparatus. Therefore, the inspection is not performed on a location (hot spot) that was not even judged as a defect on the reticle but that may become a defect at the time of exposure to a wafer.

In addition, since from the above-mentioned reason, it is impossible to perform the inspection on the wafer after the pattern formation, the evaluation result of the relative position is not reflected on wafer inspection. As described above, in the conventional method, the inspection is not done on a pattern that may become a defect and the inspection cannot be done after the transferring to the wafer because of the pattern inspection of plural layers. Therefore, the scanning electron microscope for reticle (CD-SEM) has no function of transferring the evaluation result of the relative position to the scanning electron microscope for wafer (CD-SEM).

Moreover, in the double patterning technology, since unlike the conventional technology, the patterning is performed on the same layer by two processes, and consequently the relative position between the patterns on the two reticles becomes important. Since in the conventional exposure process, patterns of the same layer on a substrate are manufactured with one reticle, quality of the pattern has been evaluated only on the one reticle. From such circumstances, the technology of evaluating a relative position between patterns on the two reticles has not been established so far.

The present invention is made to solve the new problem as described above, and has an object to provide a reticle inspection technology that enables evaluation of the relative position between the patterns, for a pattern that may become a defect at the time of the exposure to samples such as a wafer in the double patterning technology to the same layer.

In order to attain the above-mentioned object, the present invention is characterized by being configured as follows.

(1) An apparatus for inspecting a reticle that inspects two reticles used in order to form patterns in the same layer on a substrate using the double patterning technology has: a coordinate information input unit for inputting coordinate information of a pattern of a measuring object; an image input unit for acquiring images of patterns of the two reticles based on the obtained coordinate information; an image overlay unit for overlaying the images of the two reticles at the same coordinates; a relative position calculation unit for finding a relative position between the patterns on the two reticles; an evaluation unit for assigning an index of the overlaying accuracy based on the relative position and evaluates whether the two reticles need repair, and an evaluation result output unit for outputting an evaluation result.

With such a configuration, it becomes possible to easily evaluate the relative position between the patterns with respect to the two reticles used for the double patterning technology to the same layer.

Moreover, the provided apparatus is the above-mentioned apparatus for inspecting a reticle characterized in that the image is data of an SEM image obtained by photographing the reticle with the electron microscope.

Moreover, the provided apparatus is the above-mentioned apparatus for inspecting a reticle characterized in that the image is image data obtained by lithography simulation of predicting a pattern on the substrate based on the data of the SEM image obtained by photographing the reticle with the scanning electron microscope.

Moreover, the provided apparatus is the above-mentioned apparatus for inspecting a reticle characterized in that the coordinate information input unit uses hot spot coordinates included in CAD data.

Moreover, the provided apparatus is the above-mentioned apparatus for inspecting a reticle characterized in that the relative position calculation unit is capable of inputting a defined value corresponding to the amount of displacement from the design value of each pattern when the two reticle patterns are overlaid to each other.

Moreover, the provided apparatus is the above-mentioned apparatus for inspecting a reticle characterized in that the evaluation unit is capable of judging whether the relative position between the two reticle patterns satisfies the defined value or not or is neither of the two states.

Moreover, the provided apparatus is the above-mentioned apparatus for inspecting a reticle characterized in that the evaluation result output unit is capable of outputting an overlaid image that was used for the judgment.

Moreover, the provided apparatus is the above-mentioned apparatus for inspecting a reticle characterized in that the evaluation result output unit is capable of displaying the evaluation result of the relative position on a reticle map.

Moreover, the provided apparatus is the above-mentioned apparatus for inspecting a reticle characterized in that the evaluation result output unit is capable of transferring the evaluation result to a wafer inspection apparatus.

Moreover, the provided apparatus is the above-mentioned apparatus for inspecting a reticle characterized in that the image overlay unit overlays the images of the two reticles at the same coordinates by correcting a magnification and rotation.

Moreover, the provided apparatus is the above-mentioned apparatus for inspecting a reticle characterized by having remanufacture judging means for judging which reticle of the two reticles will be remanufactured based on the image and design data of the reticle pattern.

Moreover, the provided apparatus is the above-mentioned apparatus for inspecting a reticle characterized by having reticle repair information creation means for creating pattern repair information for remanufacture of the reticle.

(2) A provided method is an inspection method using an apparatus for inspecting a reticle for inspecting two reticles used in order to form patterns on the same layer on a substrate using the double patterning technology, including the steps of: inputting coordinate information of measuring points of a pattern of a measurement object; acquiring images of patterns of the two reticles based on the obtained coordinate information; overlaying the images of the two reticles at the same coordinates by correcting a magnification and rotation; finding a relative position between the two reticle patterns; assigning an index of overlaying accuracy based on the relative position and evaluating whether the two reticles need repair; and outputting an evaluation result.

Moreover, the provided method is the above-mentioned method for inspecting a reticle, characterized in that the image is SEM image data obtained by photographing the reticle with the scanning electron microscope.

Moreover, the provided method is the above-mentioned method for inspecting a reticle, characterized in that the image is image data obtained by exposure simulation for predicting a pattern on the substrate based on the SEM image data that was obtained by photographing the reticle with the scanning electron microscope.

Moreover, the provided method is the above-mentioned method for inspecting a reticle, characterized in that the coordinate information input unit uses the hot spot coordinates included in the CAD data.

According to the present invention, the relative position between the patterns on the two reticles that are used in order to form fine patterns on the same layer using the double patterning technology can be evaluated.

DETAILED DESCRIPTION OF THE PREFERRED EMBODIMENTS

Hereafter, embodiments of the present invention will be described in detail with reference to the drawings.

Figure 1:
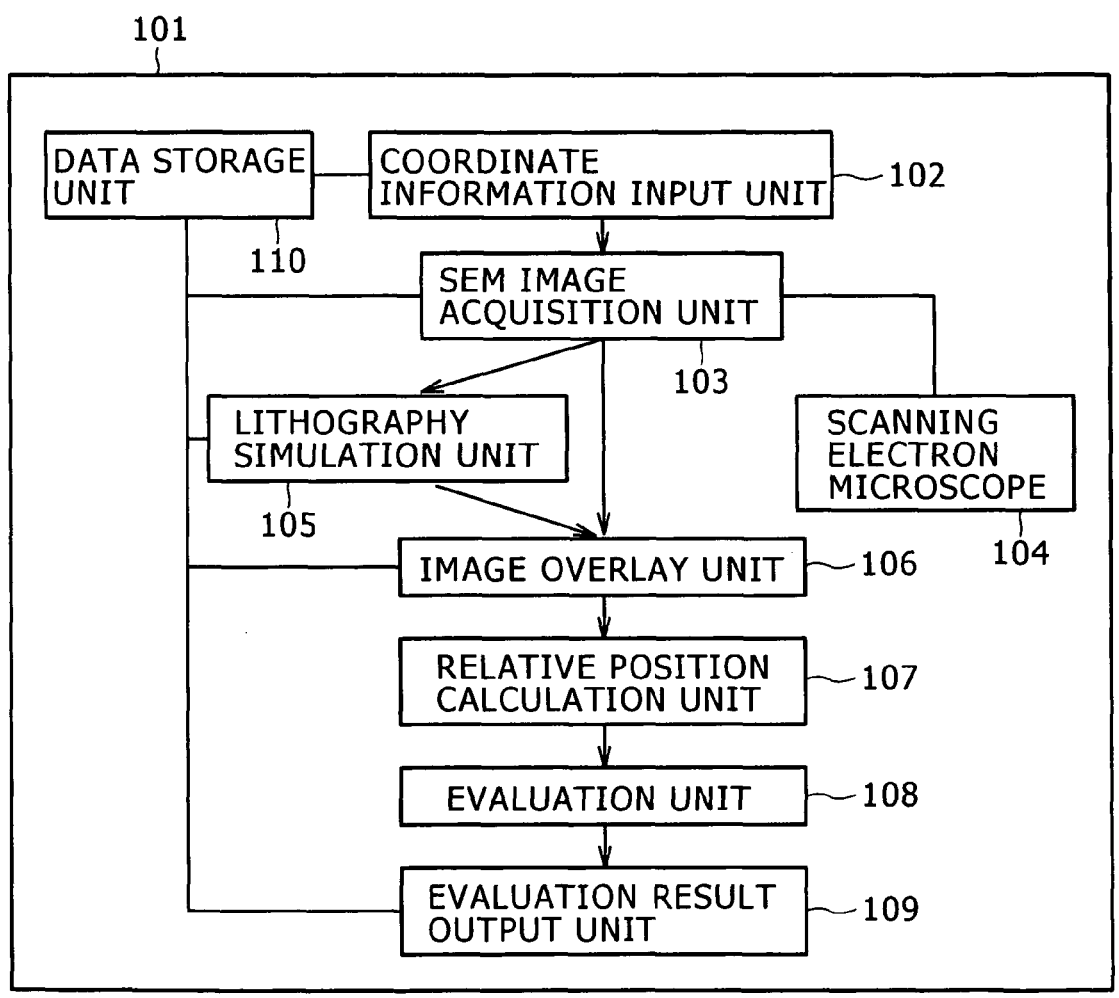
FIG. 1 is a block diagram showing an entire configuration of one embodiment of the present invention.

FIG. 1 shows one embodiment of an apparatus for inspecting a reticle. This inspection apparatus enables a relative position between patterns on reticles for the double patterning to be evaluated on the apparatus. In the above, the "relative position" is a distance between the patterns in this embodiment.

An apparatus for inspecting a reticle 101 includes: a coordinate information input unit 102; an SEM image acquisition unit 103; a scanning electron microscope (SEM) 104; an lithography simulation unit 105; an image overlay unit 106; a relative position calculation unit 107; an evaluation unit 108; an evaluation result output unit 109; and a data storage unit 110.

The coordinate information input unit 102 acquires coordinate information of a hot spot from CAD data. The SEM image acquisition unit 103 acquires an SEM image at the coordinates acquired by the coordinate information input unit 102. The lithography simulation unit 105 performs lithography simulation on the SEM image acquired by the SEM image acquisition unit 103 to obtain an image on a wafer. The SEM images of the two reticles or the images acquired by the lithography simulation are overlaid at the same coordinates using the image overlay unit 106. The relative position is measured for each pattern (pattern element) using the relative position calculation unit 107. The index is assigned to the relative position using the evaluation unit 108. The obtained evaluation result is outputted using the evaluation result output unit 109. In order to store the data formed using the above units, the data storage unit 110 is provided.

Being equipped with these units, the apparatus for inspecting a reticle becomes capable of easily performing the hot spot inspection.

Figure 2A:
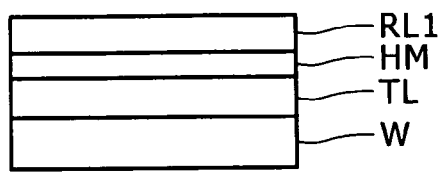
FIGS. 2A to 2H are diagrams showing one example of the double patterning technology.

FIGS. 2A to 2H show one example of a process flow of the double-patterning. As shown in FIG. 2A, a substrate W has a target layer TL, a hard mask layer HM on the top part of the target layer TL, and a resist layer RL1 on the top part of the hard mask layer HM.

Figure 2E:
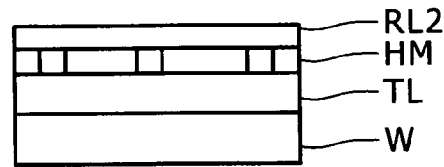
Figure 2B:
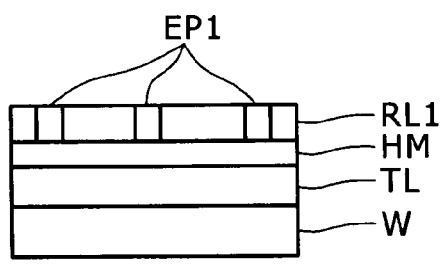
Figure 2F:
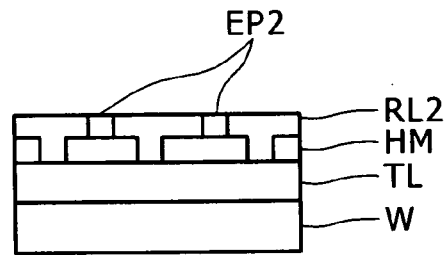
Figure 2C:
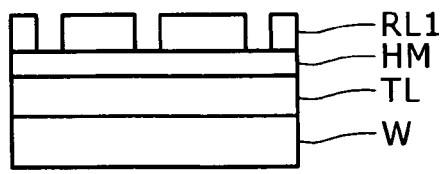
Figure 2G:
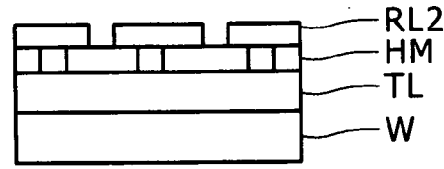
Figure 2D:
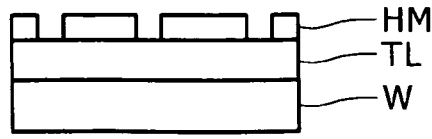

In the first patterning, the resist layer RL1 forms an exposure pattern EP1 by an exposure system (FIG. 2B), and undergoes development (FIG. 2C). Next, the hard mask layer HM is etched, and the first pattern is transferred onto the hard mask layer HM as illustrated in FIG. 2D.

Subsequently, in order to perform the second patterning, the resist layer RL1 is peeled off, and the auxiliary resist layer RL2 is added to the hard mask layer HM, as illustrated in FIG. 2E. The second exposure is performed by the same method as the above. By performing the exposure using a corresponding reticle, an exposure pattern EP2 is formed in a resist layer RL2 (FIG. 2F), and development is performed (FIG. 2G). It becomes possible to form, in the same layer, a minute pattern that cannot be formed with one time of exposure in the same layer due to inadequate resolution capability.

Figure 2H:
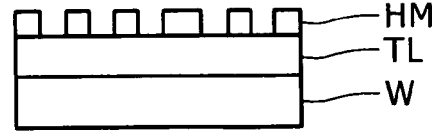

Next, the hard mask layer HM is etched again and the resist layer RL2 is peeled off, which leads to formation of the target pattern on the hard mask layer HM as illustrated in FIG. 2H.

Transferring of the final pattern is attained by performing third etching to the target layer TL.

The pattern inspection in the double-patterning is first performed to a film structure of FIG. 2H using a wafer inspection apparatus before the pattern is transferred onto the target layer TL. In the case where the inspection shows that a desired pattern is not formed in a prescribed accuracy, since processing to the target layer TL has not yet been performed, reproduction of the wafer is possible by peeling off the hard mask layer HM and repeating the process again. On the other hand, in the double-patterning on plural target layers, since the underlayer target layer has already been processed (etching) in a stage of processing of the upperlayer target layer, the reproduction is difficult.

Figure 3:
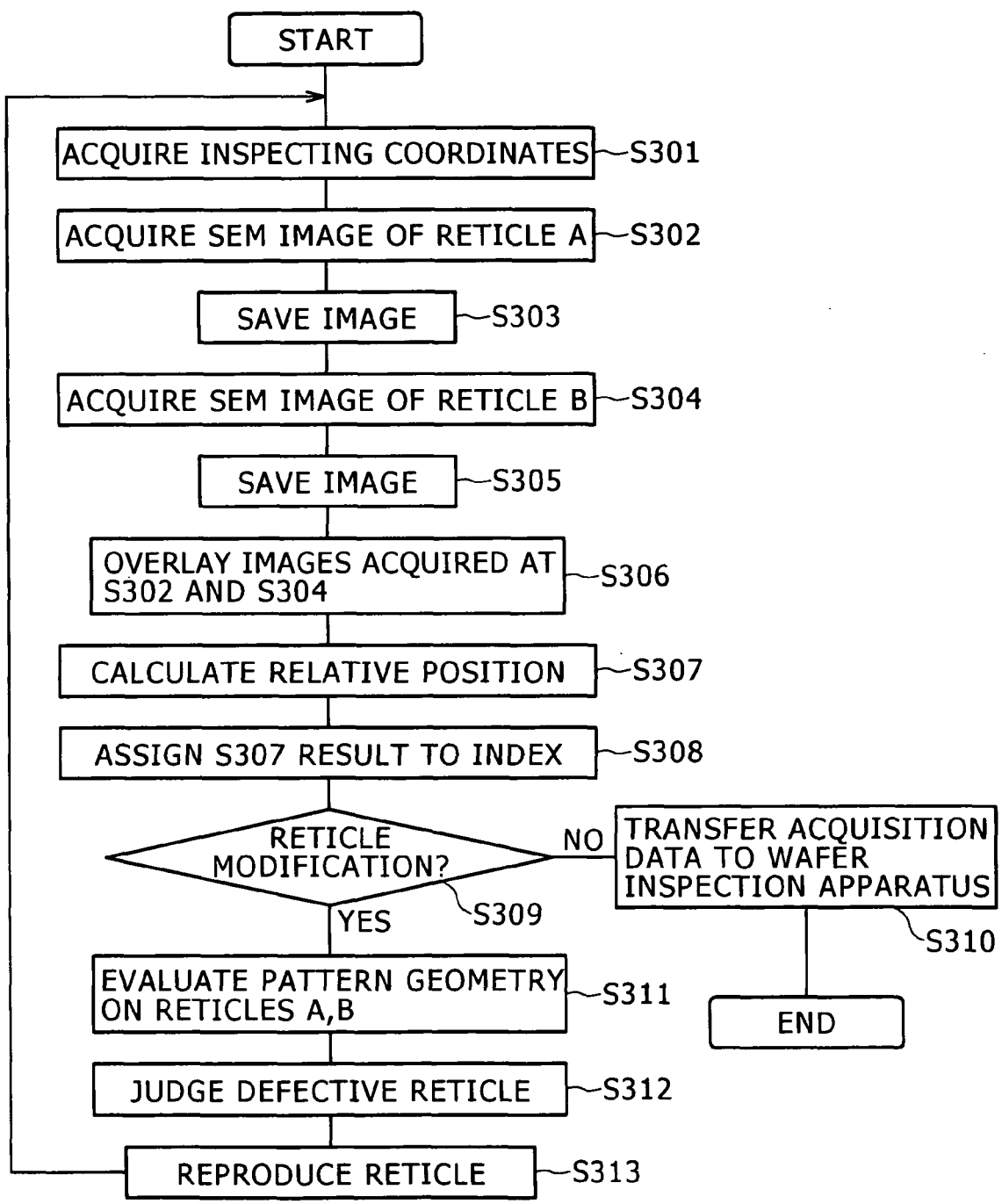
FIG. 3 is a flowchart showing to explain operation procedures of a reticle evaluation system shown in FIG. 1.

Hereafter, regarding the apparatus for inspecting a reticle of FIG. 1 according to one embodiment of the present invention, its inspection system will be explained with reference to a flowchart of FIG. 3.

First, the CAD data is read using the coordinate information input unit 102 to obtain the coordinate information of a pattern of a measuring object (S301).

Based on the coordinates obtained above, the SEM image data is acquired by the SEM image acquisition unit 103 using the scanning electron microscope 104 (S302). The obtained SEM image data is saved in the data storage unit 110 (S303).

The SEM image data includes the coordinate information of the measuring points, which is used when an overlaid image is formed. The acquisition of the coordinate information is done by comparison of the coordinates with the CAD data using an alignment mark existing on the reticle as a reference.

After measuring necessary points, the reticle A is replaced with the reticle B, the SEM image data is acquired by the SEM image acquisition unit 103 for a pattern of the reticle B corresponding to a measured pattern of the reticle A (S304), and it is saved in the data storage unit 110 with the coordinate information (S305).

After the image is acquired, the two SEM images are overlaid at the same coordinates using the image overlay unit 106 (S306), and the relative position between the patterns on the two reticles is calculated by the relative position calculation unit 107 (S307). Incidentally, the evaluation of the relative position may be performed while the reticle B is under measurement.

The obtained result is saved in the data storage unit 110. At this time, the overlaid image obtained by overlaying the two images is displayed on a display. Next, an index is assigned to the acquired relative position (S308).

It is determined from the judgment result of the index of overlaying accuracy whether the reticle needs repair or not (S309), and if the repair of the reticle is unnecessary, the evaluation result is transferred to the wafer inspection apparatus (S310).

On the other hand, if the repair of the reticle is judged necessary, the shape evaluation of the reticle A and the reticle B is performed, respectively, and then it is judged which of the reticles A, B is a defective reticle (S312), and the reticle is remanufactured (S313). For the reticle that was not remanufactured, the SEM image data need not be acquired (S302, S304).

As the coordinates of the measuring pattern that are acquired at the coordinate information acquisition step S301 of this embodiment, the hot spot coordinates included in the CAD data may be used. However, the coordinates that were judged as the hot spot by other inspection apparatus may be used. The latter method is more efficient than the former because the latter has fewer measuring points. Alternatively, the operating personnel may specify coordinates based on the CAD data.

The method for overlaying images at an image overlaying step S306 of this embodiment just requires the two acquired images to be overlaid as it is. Preferably, the images are corrected under conditions of performing the exposure actually and are overlaid. Conditions that will be repaired become, specifically, a magnification and rotation at the time of the exposure obtained from the inspection result of the reticle.

Calculation of the relative position at the relative position calculation step S307 of this example is specified to include an alignment error at the time of the exposure. Specifically, it becomes a horizontal shift error. For the images used for evaluation of the relative position, the image acquired at Steps S302 and S304 are used. It may be all right to predict a pattern on the wafer using the lithography simulation unit 105 and use that image.

The index assigned at the evaluation step S308 of this example is generated, for example, by ranking or giving an order to the amount of displacement from the design value. By embedding this index information into the data, the wafer can be inspected according to the index at the time of wafer measurement. Unlike the reticle inspection, a high throughput is required in wafer inspection. Therefore, it is very effective for the present invention to narrow the hot spots that should be inspected on the wafer and prioritize them in performing practical wafer quality control.

Figure 4:
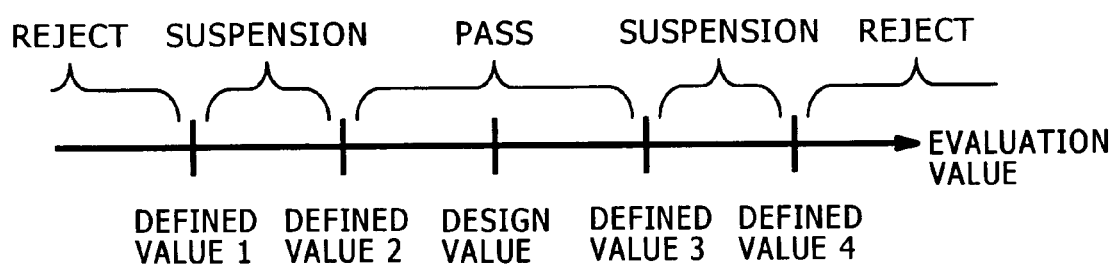
FIG. 4 is a diagram showing a relation between a defined value and a judgment result.

As one example of ranking for each index, FIG. 4 shows a method for classifying the amount of displacement into pass/suspension/reject.

In doing the classification, a setup of a defined value is required first. Here, the defined value is equivalent to the amount of displacement from the design value for each pair of patterns that are obtained by overlaying the two reticle patterns. For example, as shown in FIG. 4, the defined values 1 to 4 are specified based on the amount of displacement from the design value. Here, a value on the horizontal axis corresponds to the evaluation value of the relative position, and concretely is a distance or an overlapping area between patterns, for example.

For the defined value, when the SEM images are used, the defined value for the reticles is used for the accuracy evaluation; when the exposure simulation images are used, the defined value for wafer is used for it. Regarding these defined values, values included in the CAD data may be used or the operating personnel may specify them. Besides, the same value may be used for all the patterns, or the defined values may be set up for respective patterns.

In the evaluation of overlaying accuracy, when the evaluation value is included in domains of the defined values 2 and 3, it is judged as pass. This indicates that the measured pattern is a good pattern that is allowed to be transferred onto the wafer as it is. On the other hand, when the evaluation value is in the outside of the defined values 1 and the defined value 4, it is judged as reject. This indicates that the measured pattern is already outside a standard on the reticle. When the evaluation value is in between the defined value 1 and the defined value 2 or in between the defined value 3 and the defined value 4, it is judged as suspension. This pattern corresponds to a pattern that is judged as permitted when being on the reticle but that is likely to be a defect after being exposed onto the wafer.

As described above, three kinds of judgment results: pass/suspension/reject are obtained. These pieces of information are data-saved as feature information with the coordinate information and the overlaid image, and will be transferred to the wafer inspection apparatus later. Here, the feature information includes the type of pattern, an evaluation location, an evaluation value, and an evaluation result.

Figure 5A:
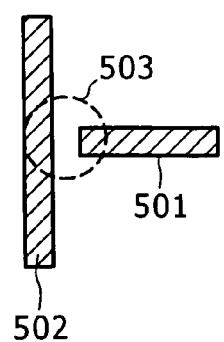
FIGS. 5A to 5C are one example of a pattern defect when resolution capability is inadequate.
Figure 5B:
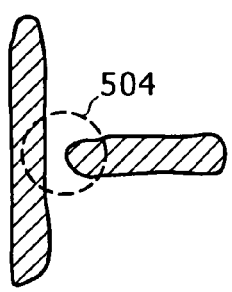
Figure 5C:
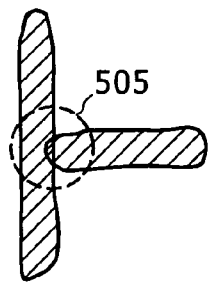

FIGS. 5A to 5C show one example of a pattern defect caused by inadequate resolution capability. As shown in FIG. 5A, when the pattern composed of the pattern 501 and the pattern 502 is formed on the reticle, evaluation of a location (gap) 503 where the two patterns lie most adjacent to each other becomes important. In the case where exposure is performed with this pattern, when the pattern is formed properly, the pattern takes a form as shown by FIG. 5B, and the two patterns (pattern elements) are transferred, being separated by a gap 504. In the pattern such that a distance between two patterns (pattern elements) is short, there may be a case where, because of inadequate resolution capability of the exposure system, a pattern that the two pattern elements are connected as shown in FIG. 5C is formed. This is a phenomenon called a "short" and is one example of the hot spot arising from the reticle. In the example of this pattern, the gaps 503, 504, and 505 become the hot spots.

Figure 6A:
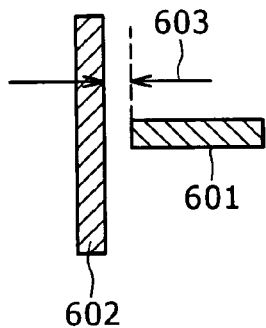
FIGS. 6A to 6C are an example of division of a reticle pattern in the double-patterning.
Figure 6B:
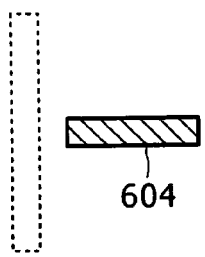
Figure 6C:
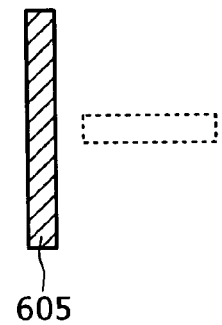

In order to solve an exposure defective problem of the minute pattern caused by such inadequate resolution capability, the double patterning technology is used. FIGS. 6A to 6C show its example. In a pattern composed of a pattern 601 and a pattern 602 shown in FIG. 6A, in the case where the distance 603 between the patterns are short compared to resolution capability of the exposure system, if these patterns are formed on the same reticle and exposure is performed using the reticle, the pattern will be transferred in a state where the two patterns are connected to each other as shown by FIG. 5C.

In order to prevent this phenomenon, the two patterns are divided as shown in FIG. 6B and FIG. 6C (for example, a pattern 604 is formed in the reticle A and a pattern 605 is formed in the reticle B), and are exposed onto the wafer in two separate steps. The use of this technique makes it possible to process the minute pattern by compensating for inadequate resolution capability of an exposure system. When double exposure is performed using two reticles, a mutual relation of the two patterns becomes important.

On the other hand, contrary to the above-mentioned operation, if images of the reticle patterns of FIG. 6B and FIG. 6C are acquired by the apparatus for inspecting a reticle and are overlaid to each other, an image of FIG. 6A is obtained. At this time, the relative position of the patterns is evaluated with a distance 603 between the patterns.

An example of evaluation of the relative position is shown using a concrete pattern in FIGS. 7A, 7B and FIGS. 8A, 8B.

Figure 7A:
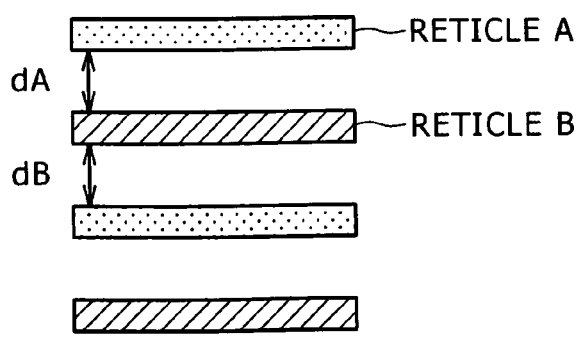
FIGS. 7A and 7B are plan views showing one example of evaluation of a relative position.
Figure 7B:
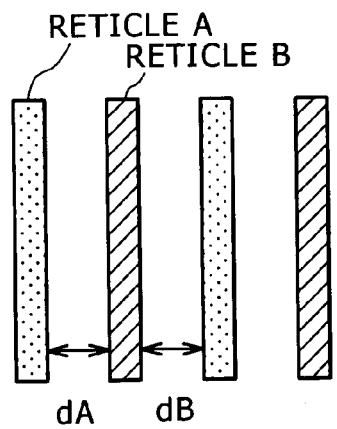

FIGS. 7A and 7B show a quality control (QC) pattern. In this pattern, the evaluation of the relative position is performed using distances dA, dB between the two patterns. A method for calculating the distances dA, dB may be one that calculates a shortest distance between the patterns, or may be one that calculates a distance between specified coordinates.

Figure 8A:
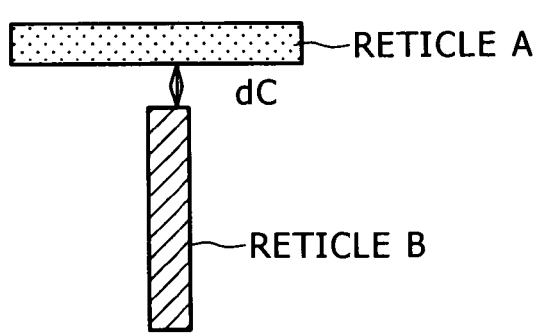
FIGS. 8A and 8B are plan views showing one example of evaluation of the relative position.
Figure 8B:
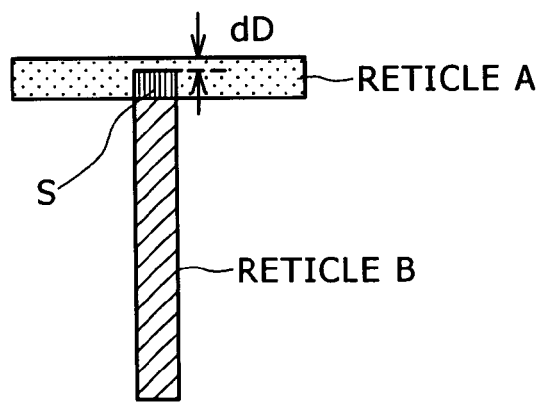

FIGS. 8A and 8B show typical examples of the hot spot. FIG. 8A shows a pattern that is liable to cause a short, and FIG. 8B shows a pattern that is liable to cause a disconnection.

In FIG. 8A, since a body part of the pattern of the reticle A and an end part of the pattern of the reticle B are very close to each other, a portion that originally must not be conducting may become electrically continuous. In order to judge this, dC is calculated and compared with the defined value.

On the other hand, in FIG. 8B, although it is a pattern that originally is required to establish conduction, if the pattern of the reticle B separates from the pattern of the reticle A, the pattern will become defective conduction. In order to check this possibility, a distance dD between the end part of the pattern and a conductor part of the other pattern is measured and an overlapping area S of the two patterns is measured.

The quality of the reticle pattern that was formed is judged by comparing the above measurement result and the defined value. Since the measuring point and the measuring object may be different depending on the pattern, the defined value used for the judgment depends on the pattern as described above. Therefore, the present invention accompanies a function of classifying the pattern at the time of acquiring the image. Moreover, in the case where defined value information is can be found for each hot spot, it is decided that the inputted image shall be processed according to each defined value.

Figure 9:
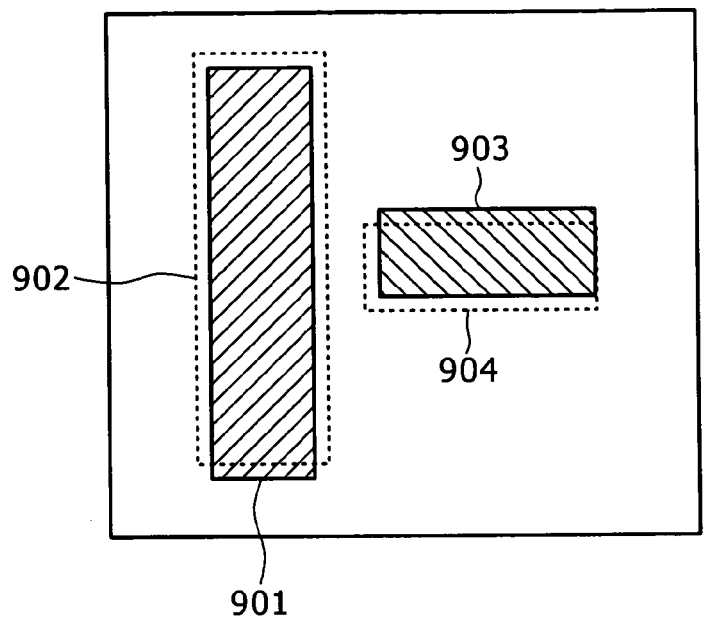
FIG. 9 is one example of an overlaid image.

FIG. 9 shows a display example of the overlaid image formed when evaluating the double patterning and it is displayed on the display of the apparatus for inspecting a reticle 101. First, an image including a pattern 901 and an image including a pattern 903 are overlaid at the same coordinates. Further, a contour pattern 902 of the CAD data corresponding to the pattern 901 and a contour pattern 904 of the CAD data corresponding to the pattern 903 are overlaid on this overlaid image. Incidentally, existence of a display of this CAD data is selectable.

Moreover, this image file is made to have an attached file in which feature information is saved, and the file is made capable of being read simultaneously and being displayed on a screen.

Figure 10A:
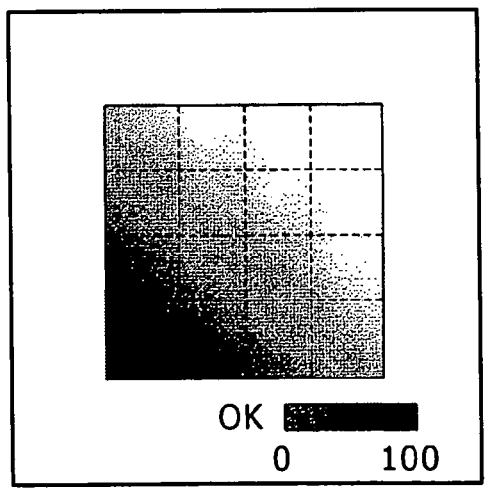
FIGS. 10A and 10B are an example of a reticle map.
Figure 10B:
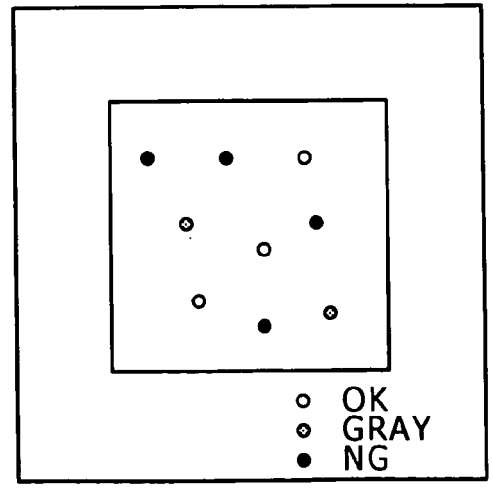

In order to make it possible to obtain the judgment result of the hot spot on the reticle to be obtained by the measurement and to be decided easily by visualizing it, a reticle map as shown in FIGS. 10A and 10B is formed. FIG. 10A is a map showing the whole plane of the reticle; FIG. 10B is a map showing a single chip in the reticle.

FIG. 10A is the reticle map showing a distribution of specific evaluation results, which visualizes a situation: in which area of the reticle specific evaluation results appear largely. The evaluation result is, for example, pass/suspension/reject. One of them is selected and pertinent results are displayed. A display style of the figure may be one that displays the number of specific judgment results or one that displays a ratio of the number of measuring spots in the area.

FIG. 10B is the reticle map that displays an enlarged chip of the reticle, showing the hot spots as dots. Here, every dot is displayed after being colored according to pass/suspension/reject.

These dots are displayed and manipulated on the screen of the apparatus 101 for inspecting a reticle, so that a specific location can be checked by enlargement in addition to displaying the whole plane of the reticle. In addition, if the hot spot is selected, the result of the location can be referred to.

Figure 11:
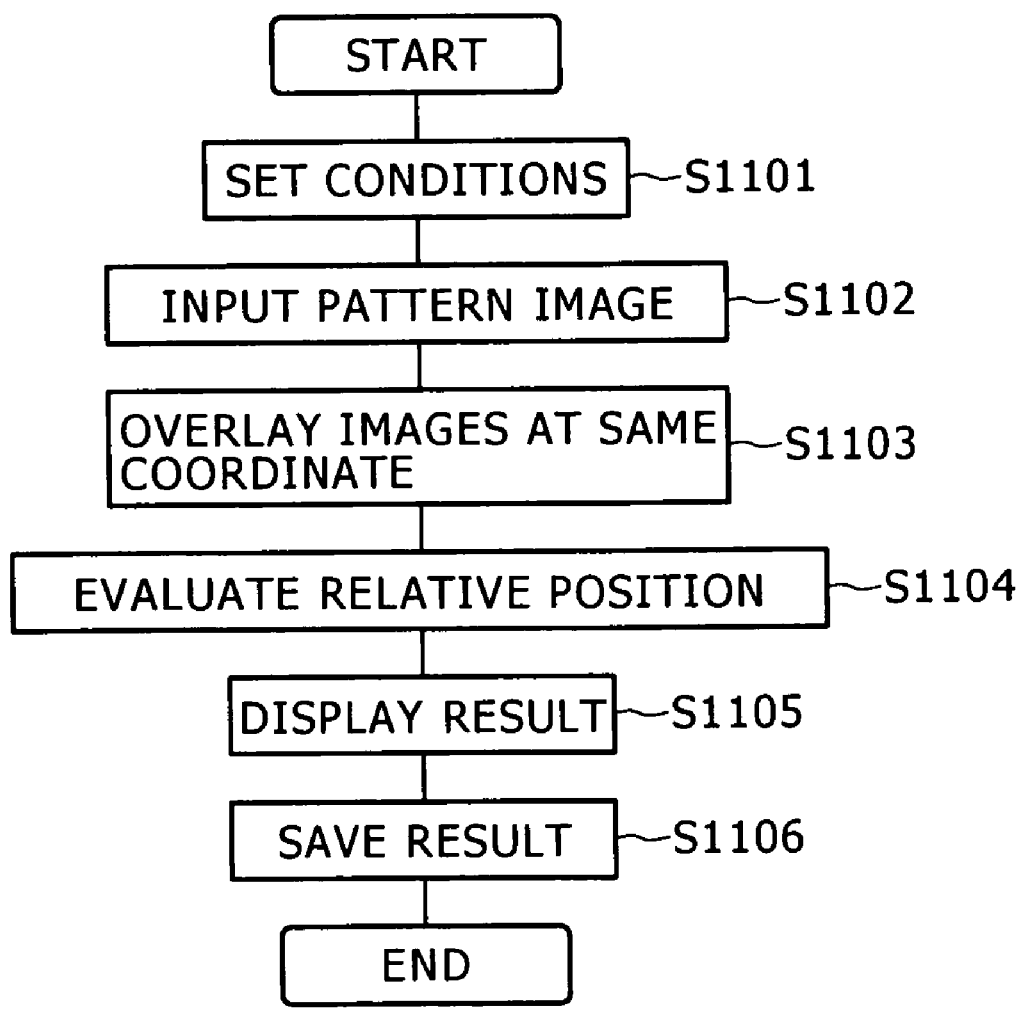
FIG. 11 is a flowchart of evaluation of the relative position.

Next, an evaluation method for the relative position using the apparatus for inspecting a reticle shown in FIG. 1 will be explained with reference to FIG. 11. First, the evaluation conditions of the relative position are set (S1101). Here, the conditions are the defined values, for example.

Next, a pattern image is inputted (S1102), and the images are overlaid at the same coordinates to form an image (S1103). In inputting the pattern image, SEM image data of the reticles A, B saved in the data storage unit 110 of the apparatus for inspecting a reticle 101 or an image obtained by the lithography simulation unit 105 is read. Evaluation of the relative position is performed on the obtained overlaid image (S1104), and the result is displayed (S1105) and saved (S1106). When in the evaluation of the relative position it is judged the reticle needs repair, it is required to judge in which side of the two reticles the defect is generated.

Figure 12:
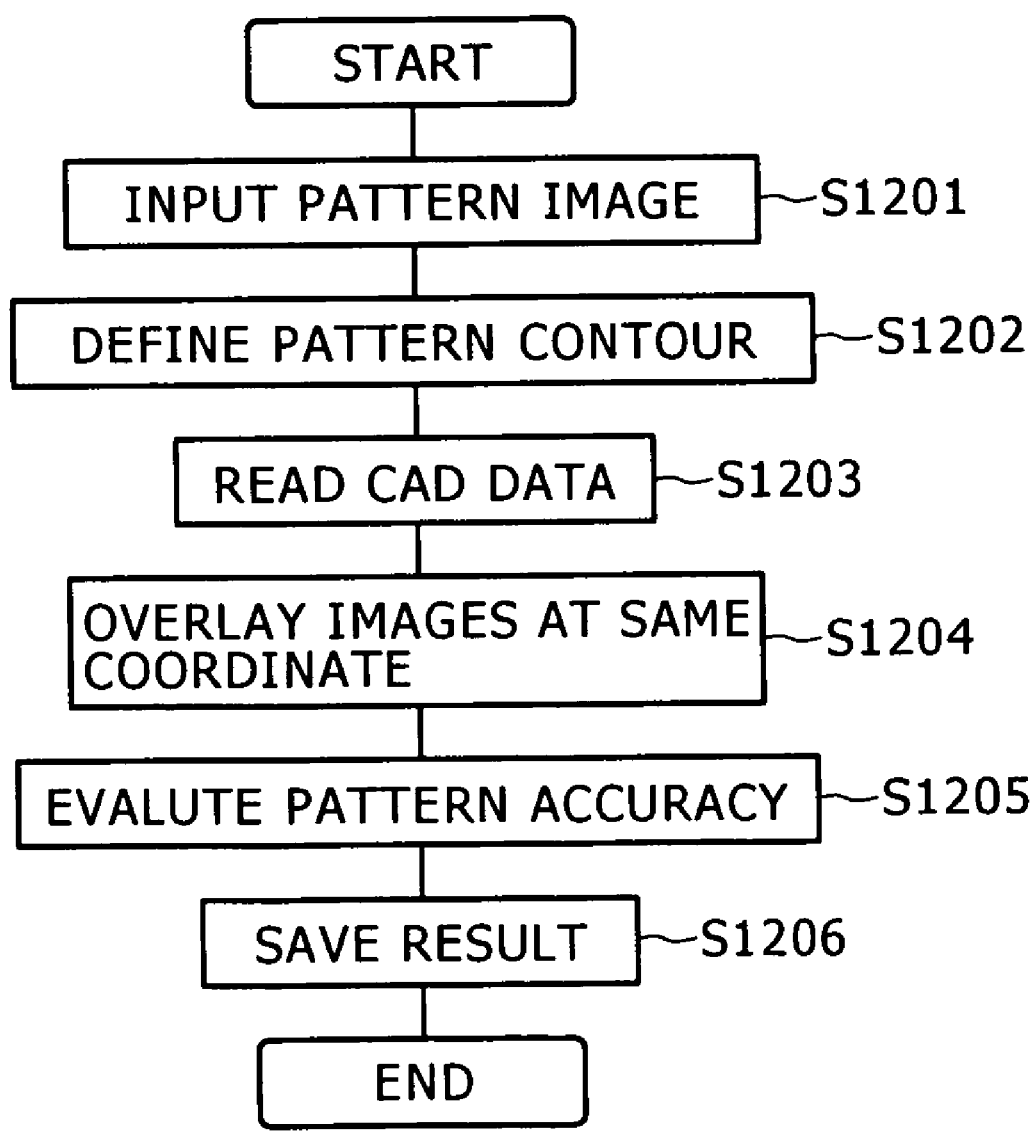
FIG. 12 is a flowchart of comparison between a pattern image and design data of a reticle pattern.

Before judging which one of the two reticles should be repaired, it is necessary to evaluate the amount of displacement of each reticle from design data. FIG. 12 shows a flowchart of comparing the generated pattern with the design data for the each reticle. The each reticle undergoes this judgment process individually.

When inputting the pattern image (S1201), the image of the reticle measured by the apparatus for inspecting a reticle 101 is read from the data storage unit 110. A pattern contour defining processing is performed on the inputted image, and a contour line of the pattern image is generated (S1202). Next, the CAD data of that reticle of corresponding coordinates is read from the data storage unit 110 (S1203), and is overlaid on the above-mentioned contour data (S1204). Further, the image whose contour was defined and the CAD data are compared, the amount of displacement of the pattern from the design value is calculated to evaluate accuracy (S1205), and the result is saved (S1206).

Figure 13:
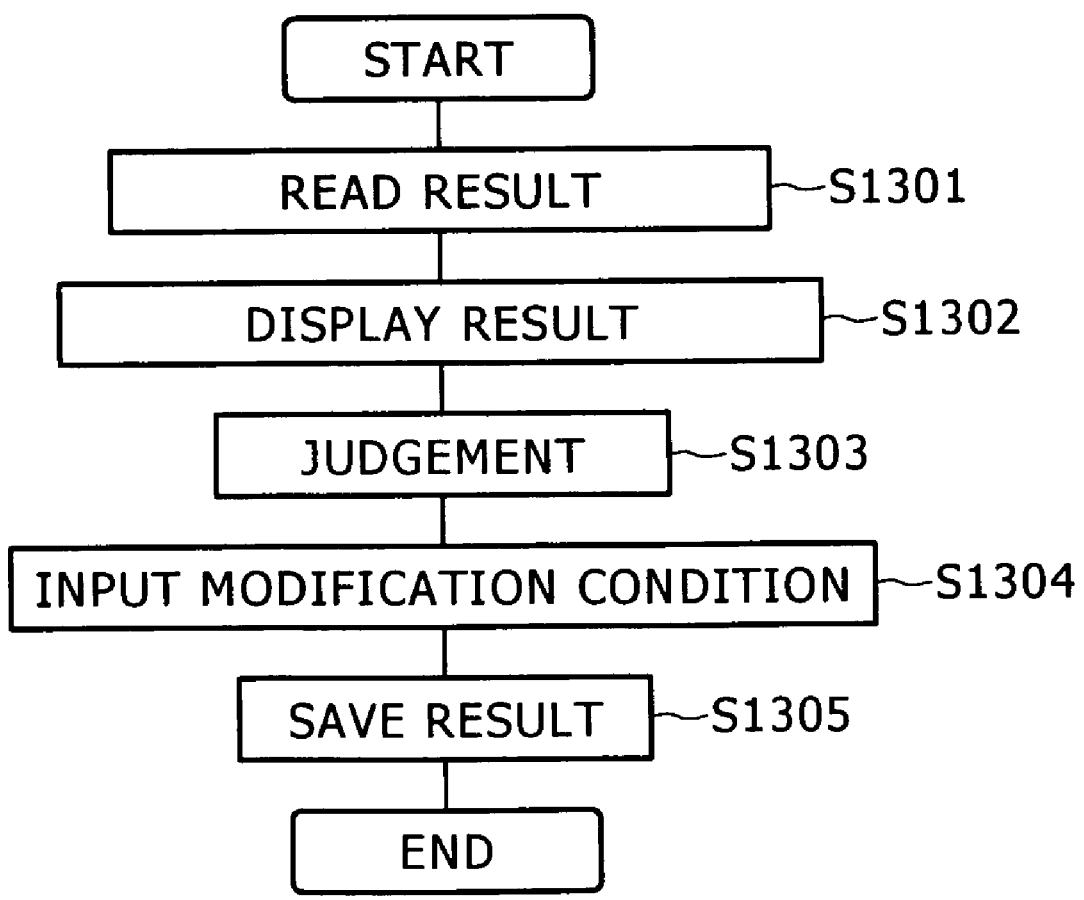
FIG. 13 is a flowchart of judging a mask that will be repaired.

FIG. 13 shows a flowchart of judging a mask that will be repaired based on the result obtained by the comparison with the design data. First, the evaluation result obtained at the pattern evaluation step S1205 of the flowchart is read (S1301). Next, a list of the obtained results is displayed (S1302). The results include the overlaid images shown in FIG. 9, the inspected locations, and the evaluation results. It is judged which mask will be repaired from the above-mentioned obtained results (S1303). A criterion is established by judging the following comprehensively: the number of patterns that will be repaired, the ease of repair, time and the number of steps required to perform the repair, a cost, etc. After deciding the reticle that will be repaired, the repair conditions of the reticle pattern are set (S1304). For the repair (remanufacture) conditions, the amount of displacement from the design data may be used as it is. However, if there is a shift from the design data even in the pattern of the reticle that will not be repaired, this amount of displacement is added as an offset. After deciding the repair conditions, the result is saved (S1305).

The obtained result is data-transferred to a reticle defect repair system, and is used when repairing a pattern on the reticle that is judged to need to be repaired in the above-mentioned process.

As described in detail above, according to the present invention, a reticle inspection technology can be realized that judges whether the relative position satisfies the defined value or not or is a state that cannot be said as either for a pattern that may become a defect at the time of the exposure to the wafer in performing the double-patterning on the same layer.

Moreover, since the present invention is intended to perform pre-inspection on the reticle that is for performing a final inspection on the wafer, it is all right to give a judgment of the state that cannot be said as either, and a final decision is made by the wafer inspection apparatus. If the patterns are on the same layer, inspection with the scanning electron microscope for length measurement generally used is possible. In addition, since the processed layer is not etched, it is easy to reproduce it.

Moreover, as a result, a system can be provided that can evaluate a reticle for double patterning without performing exposure and that can improve a yield of a product by repairing or remanufacturing a defective reticle before the exposure.

Furthermore, it becomes possible to focus on checking the hot spot by transferring the obtained measurement result to the inspection apparatus for wafer. Therefore, the present invention can provide a system that attains improvement in the throughput of the wafer measurement.

What is claimed is:

1. An apparatus for inspecting a reticle that inspects two reticles used in order to form patterns on the same layer on a substrate using the double patterning technology, comprising:
   a coordinate information input unit for inputting coordinate information of a pattern of a measuring object;
   an image input unit for acquiring images of patterns of the two reticles based on the obtained coordinate information;
   an image overlay unit for overlaying the images of the two reticles at the same coordinates;
   a relative position calculation unit for finding a relative position between the patterns on the two reticles;
   an evaluation unit for assigning an index of overlaying accuracy based on the relative position and evaluates whether the two reticles need repair; and
   an evaluation result output unit for outputting an evaluation result.

2. The apparatus for inspecting a reticle according to claim 1, wherein the image is SEM image data obtained by photographing the reticle with an electron microscope.

3. The apparatus for inspecting a reticle according to claim 1, wherein the image is image data obtained by lithography simulation for predicting a pattern on the substrate based on data of an SEM image obtained by photographing the reticle with an electron microscope.

4. The apparatus for inspecting a reticle according to claim 1, wherein the coordinate information input unit uses hot spot coordinates included in CAD data.

5. The apparatus for inspecting a reticle according to claim 1, wherein the relative position calculation unit is capable of inputting defined values corresponding to an amount of displacement of the each pattern from a design value for the each pair of patterns obtained by overlaying the two reticles.

6. The apparatus for inspecting a reticle according to claim 5, wherein the evaluation unit is capable of judging whether the relative position of the two reticle patterns satisfies the defined value or not or is neither of the two states.

7. The apparatus for inspecting a reticle according to claim 1, wherein the evaluation result output unit is capable of outputting an overlaid image used for the judgment.

8. The apparatus for inspecting a reticle according to claim 1, wherein the evaluation result output unit is capable of displaying the evaluation result of the relative position on a reticle map.

9. The apparatus for inspecting a reticle according to claim 1, wherein the evaluation result output unit is capable of transferring the evaluation result to a wafer inspection apparatus for inspecting a pattern on the sample.

10. The apparatus for inspecting a reticle according to claim 1, wherein the image overlay unit overlays images of the two reticles at the same coordinates by correcting a magnification and rotation.

11. The apparatus for inspecting a reticle according to claim 1, comprising repair judging means for judging which reticle of the two reticles will be repaired based on the image and design data of the reticle pattern.

12. The apparatus for inspecting a reticle according to claim 11, comprising a reticle repair information creation means for creating pattern repair information for remanufacture of the reticle.

13. An inspection method using an apparatus for inspecting a reticle that inspects two reticles used in order to form patterns on the same layer on a substrate using the double patterning technology, comprising the steps of:
    inputting coordinate information of a measuring point of a pattern of a measuring object;
    acquiring images of patterns of the two reticles based on the obtained coordinate information;
    overlaying the images of the two reticles at the same coordinates by correcting a magnification and rotation;
    finding a relative position between the two reticle patterns;
    assigning an index of overlaying accuracy based on the relative position and evaluating whether the two reticles need repair; and
    outputting an evaluation result.

14. The method for inspecting a reticle according to claim 13, wherein the image is SEM image data obtained by photographing the reticle with a scanning electron microscope.

15. The method for inspecting a reticle according to claim 13, wherein the image is image data obtained by lithography simulation that predicts a pattern on the substrate based on data of an SEM image obtained by photographing the reticle with a scanning electron microscope.

16. The method for inspecting a reticle according to claim 13, wherein the coordinate information input unit uses hot spot coordinates included in CAD data.

* * * * *